Patented Apr. 26, 1932

1,855,666

UNITED STATES PATENT OFFICE

LEO P. CURTIN, OF CRANBURY, NEW JERSEY

PROCESS OF PRESERVING WOOD

No Drawing.   Application filed April 12, 1930. Serial No. 443,933.

This invention resides in an improvement in the process of treating wood and other cellulosic materials by impregnating them with an aqueous preservative, such as an aqueous solution of zinc meta-arsenite or zinc chloride followed (or preceded) by a treatment with an oily preservative, such as petroleum oil, that is, the so-called two-movement process. The improved process is of value for the treatment of railroad cross-ties and will be described and illustrated in connection therewith, although, as will appear hereinafter, it is by no means limited thereto.

In certain sections of the country, particularly in the so-called arid regions, it has been found that the mechanical life of a cross-tie is prolonged by a coating or impregnation of a hydrocarbon oil. In such localities, an untreated tie has a tendency to split, check or bloom and is frequently removed from service because of mechanical or physical deterioration before any appreciable decay or fungus or insect attack has occurred.

The principal benefit derived from the petroleum oil coating or impregnation is believed to be the retarding effect of the oil on the rate of change of the moisture content of the wood. During a period of rainfall, or of high relative humidity, the water absorption of an oil-soaked timber is less than that of a similar untreated specimen. Conversely, during a period of low relative humidity, the rate of loss of moisture from the oil-treated timber is lower than from a similar untreated specimen.

When wood loses moisture, it shrinks and as the outer portion of the wood becomes dry before the interior portion, strains are set up by the shrinkage of the outer portion which can be relieved only by cracking or checking. It follows, therefore, that the presence of an oil on wood which is exposed to rapid drying conditions will tend to keep the outer and inner portions of the wood more nearly in equilibrium with respect to moisture content and prevent a great deal of the cracking and checking which otherwise would take place. It is believed, also, that the presence of oil increases the resistance of wood to mechanical shock.

Experience has indicated that certain fractions of petroleum are particularly well adapted for protectively coating and impregnating wood, a residuum oil of high asphalt content being particularly desirable. The protection afforded by such an oil is due in part to inert and very permanent substances produced by the oxidation and polymerization of asphaltic bodies present in the oil.

If the aqueous preservative consists of zinc meta-arsenite dissolved in a volatile organic acid, such as acetic acid, the wood fiber is saturated with this powerful insecticide and fungicide and, eventually, the cell walls of the wood become covered with innumerable small, difficultly soluble crystals of zinc meta-arsenite. Railroad ties protected in this manner against decay and insects and fungus attack and with an outer deposit of oil to retard mechanical deterioration, should last for a great many years even under the most trying conditions.

In the two-movement process, that is, a method of treating wood first with an aqueous solution and afterwards with an oil, or vice versa, the presence of asphaltic bodies in the oil usually causes difficulties. Such bodies greatly increase the tendency of the oil and aqueous solution to emulsify, in fact, the asphaltic bodies act as a powerful emulsifying agent and as a stabilizer for water-in-oil emulsions. In such emulsions it is considered that the drops of aqueous liquid are surrounded by a spherical shell or film of asphaltic material.

Regardless of whether the oil treatment of the timber follows or precedes the treatment with the aqueous preservative, the oil encounters the aqueous solution on the walls of the treating retort, on the surface of the timber being treated, and elsewhere. The solution is usually taken up by the oil with the formation of an emulsion in which the oil is the continuous phase. In the course of the treatment of a number of charges of timber, the oil may take up and emulsify, say 20 to 30% of the aqueous solution and become so viscous that it no longer can be injected into the wood in a satisfactory manner.

I have discovered that, if the asphaltic or other emulsion-forming oil is treated with an oil-soluble reagent having emulsion-breaking or emulsion-inhibiting properties, it is possible to carry on indefinitely the alternate treatments of successive charges of timber with aqueous solution and oil without producing sufficient emulsion to cause operating difficulties.

As an emulsion-breaking or inhibiting reagent, I prefer to use a tar produced in the low temperature distillation of coal known as "low-temperature tar" or a fraction thereof. Such tar differs from the tar produced by the high-temperature process of coal distillation in that it contains a large proportion of cyclo-paraffins and other non-aromatic hydrocarbons and, also, a remarkably high content of phenolic bodies, or tar acids. Such tar acids are, for the most part the homologues of phenol, naphthol and related bodies and usually constitute about one third of the total tar.

A typical low-temperature tar will, on redistillation, give a distillate boiling below 300° C. equal in quantity to one-third of the original material, another third will distill over at temperatures above 300° C. and the remaining third will remain in the retort as coke. The proportion of tar acids in the three fractions is fairly uniform with a tendency for the low-boiling fraction to have as high as 35 to 40% of tar acids.

In actual practice, it is preferable, in some cases, to use the undistilled tar as the emulsion inhibitor, in other cases, the entire distillate up to coking temperature and, with certain petroleums, the distillate boiling below 300° C. The nature of the petroleum determines which material is most advantageous to use.

I am aware that it has been proposed to use cresylic acid as a breaker of the petroleum-water emulsions produced naturally in the oil fields. In the present process, however, cresylic acid alone is not desirable since, with many petroleums, and more particularly with zinc ion present in the aqueous solution, it tends to build emulsions of the lyophile type, in which oil is the disperse, and water the continuous, phase. The present process can be operated advantageously with all of the cresylic acid removed, but can also be operated with cresylic acid present.

In the operation of the process, 1 to 5 percent by volume of the crude low-temperature tar is added to the petroleum for the purpose of inhibiting emulsion formation. If one of the more active fractions is used 0.5 to 2.0 percent is usually sufficient.

In my companion application Serial No. 443,932 filed concurrently herewith I have described and broadly claimed the use of low-temperature tars and fractions thereof for breaking petroleum-water emulsions, and more particularly the breaking of the so-called oil-field petroleum-water emulsions for the recovery therefrom of their petroleum content.

I claim:

1. In the impregnation of wood with a petroleum oil and an aqueous preservative by the two-movement process the step of preventing objectionable emulsification of the oil and the aqueous liquid by adding to the oil a relatively small amount of at least a portion of low-temperature coal tar containing an active emulsion-inhibiting constituent thereof.

2. In the impregnation of wood with a petroleum oil containing asphaltic bodies and an aqueous preservative by the two-movement process the step of preventing objectionable emulsification of the oil and the aqueous liquid by adding to the oil a relatively small amount of at least a portion of a low-temperature coal tar containing an active emulsion-inhibiting constituent thereof.

3. In the impregnation of wood with a petroleum residuum oil of high asphalt content and an aqueous preservative by the two-movement process the step of preventing objectionable emulsification of the oil and the aqueous liquid by adding to the oil a relatively small amount of at least a portion low-temperature coal tar containing an active emulsion-inhibiting constitutent thereof.

4. In the impregnation of wood with a petroleum oil containing asphaltic bodies and an aqueous preservative containing zinc ions by the two-movement process the step of preventing objectionable emulsification of the oily and aqueous liquids which consists in adding to the oily liquid about from 1 to 5 percent by volume of low-temperature coal tar.

In testimony whereof I affix my signature.

LEO P. CURTIN.